(12) United States Patent
Kirilichin et al.

(10) Patent No.: US 10,040,182 B2
(45) Date of Patent: Aug. 7, 2018

(54) SYSTEM AND METHOD FOR INSTALLING A MANIFOLD PLUG

(71) Applicants: Victor Kirilichin, Madison, CT (US);
David P. Turechek, Shelton, CT (US);
Brian P. Krieger, Albion, NY (US)

(72) Inventors: Victor Kirilichin, Madison, CT (US);
David P. Turechek, Shelton, CT (US);
Brian P. Krieger, Albion, NY (US)

(73) Assignee: Engineered Inserts & Systems, Inc., Watertown, CT (US)

( * ) Notice: Subject to any disclaimer, the term of this patent is extended or adjusted under 35 U.S.C. 154(b) by 750 days.

(21) Appl. No.: 14/512,018

(22) Filed: Oct. 10, 2014

(65) Prior Publication Data

US 2015/0202754 A1    Jul. 23, 2015

Related U.S. Application Data

(60) Provisional application No. 61/929,746, filed on Jan. 21, 2014.

(51) Int. Cl.
*F16L 55/11* (2006.01)
*F16B 13/08* (2006.01)
(Continued)

(52) U.S. Cl.
CPC .......... *B25B 27/0014* (2013.01); *B25B 27/04* (2013.01); *F16B 13/0858* (2013.01);
(Continued)

(58) Field of Classification Search
CPC . B25B 27/0014; B25B 27/04; B25B 23/0064; B25B 27/00; F16L 55/1108;
(Continued)

(56) References Cited

U.S. PATENT DOCUMENTS 3,156,376 A * 11/1964 Lasting ................ B25C 3/004
221/191
3,525,365 A    8/1970 Meulendyk et al.
(Continued)

FOREIGN PATENT DOCUMENTS

BE    889487 A    11/1981
EP    0044982 A2    2/1982
(Continued)

OTHER PUBLICATIONS

International Search Report and Written Opinion Application No. PCT/US2015/011138 dated May 11, 2015 Completion Date: Mar. 16, 2015 pp. 35.

*Primary Examiner* — Ryan J Walters
*Assistant Examiner* — Lawrence Averick
(74) *Attorney, Agent, or Firm* — St. Onge Steward Johnston and Reens

(57) ABSTRACT

The present disclosure relates to an insert and system of installing the same. The insert includes a tapered core and a cylinder. The core releasably secures to an installation device which includes a depth stop or a depth control to control the installation depth of the insert. The insert may be provided in a tray that allows for easier handling of the inserts and installation thereof in installation holes, for example in a hydraulic manifold. In some cases, the core includes a threaded hole to releasably secure the insert to the installation device, thus allowing the installation device to pull the core into the cylinder. The core and cylinder may be made of metallic materials such as steels, steel alloys and others. In some cases the insert can withstand blow out pressures of 40,000 psi or higher.

13 Claims, 8 Drawing Sheets

(51) Int. Cl.
*B25B 27/00* (2006.01)
*B25B 27/04* (2006.01)
*F16L 55/13* (2006.01)
*B25B 23/00* (2006.01)

(52) U.S. Cl.
CPC ........... *F16L 55/1108* (2013.01); *F16L 55/13* (2013.01); *B25B 23/0064* (2013.01); *Y10T 29/4994* (2015.01); *Y10T 29/53691* (2015.01)

(58) Field of Classification Search
CPC ....... F16L 55/11; F16L 55/10; F16B 13/0858; F16B 13/004; Y10T 29/4994; Y10T 29/53691; B23P 19/00
See application file for complete search history.

(56) References Cited

U.S. PATENT DOCUMENTS

| | | | |
|---|---|---|---|
| 3,691,609 A | 9/1972 | Ice, Jr. et al. | |
| 4,091,841 A | 5/1978 | Beneker et al. | |
| 4,390,042 A | 6/1983 | Kucherer et al. | |
| 4,393,564 A | 7/1983 | Martin | |
| 4,421,137 A * | 12/1983 | Nusbaumer | F16L 55/13 138/89 |
| 4,462,240 A | 7/1984 | Yamamoto | |
| 4,584,755 A | 4/1986 | Lundquist | |
| 4,589,180 A * | 5/1986 | Vachon | B25B 9/00 29/263 |
| 4,646,816 A * | 3/1987 | Rothstein | F16L 55/13 138/89 |
| 4,764,055 A * | 8/1988 | Clark | E21D 20/025 405/259.2 |
| 4,765,049 A | 8/1988 | Lundquist | |
| 4,787,420 A * | 11/1988 | Wilhelm | B25B 27/026 138/89 |
| 4,831,703 A | 5/1989 | Wilhelm et al. | |
| 4,865,080 A | 9/1989 | Lundquist | |
| 5,136,796 A * | 8/1992 | Farrington | D06F 75/22 38/77.5 |
| 6,741,079 B2 * | 5/2004 | Hofmann | G01R 33/30 324/318 |
| 7,032,281 B1 | 4/2006 | Lin | |
| 8,381,934 B2 | 2/2013 | Brewer et al. | |
| 8,556,102 B2 | 10/2013 | Hersant et al. | |
| 2002/0189101 A1 * | 12/2002 | Reid | B25B 27/0014 29/897.3 |
| 2005/0000081 A1 * | 1/2005 | Reid | B25B 27/0014 29/522.1 |
| 2005/0031433 A1 * | 2/2005 | Neri | B21K 1/70 411/180 |
| 2006/0026812 A1 * | 2/2006 | Villanueva | B25B 27/0014 29/243.53 |

FOREIGN PATENT DOCUMENTS

| | | | |
|---|---|---|---|
| GB | 2175231 A | 11/1986 | |
| GB | 2218177 A * | 11/1989 | F16L 55/13 |
| WO | 9904917 A1 | 2/1999 | |

* cited by examiner

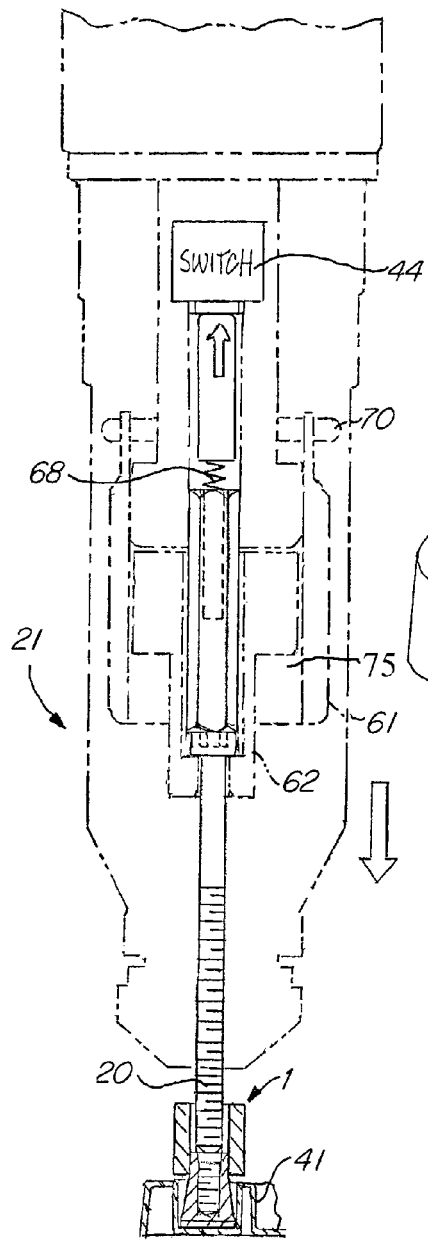
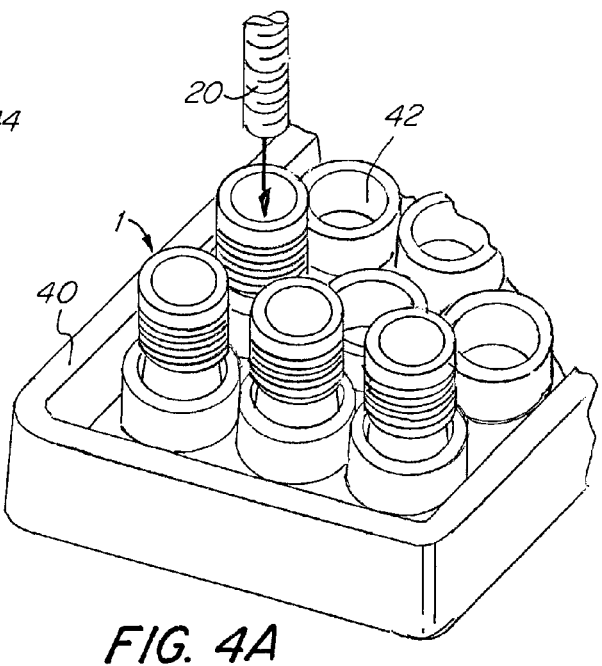
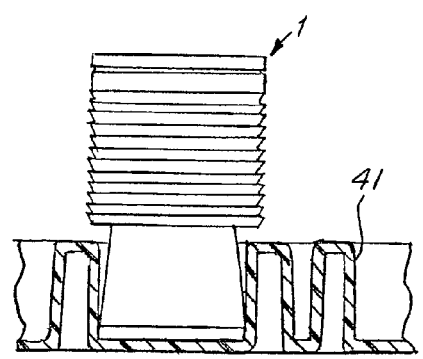
FIG. 3
FIG. 4A
FIG. 4B

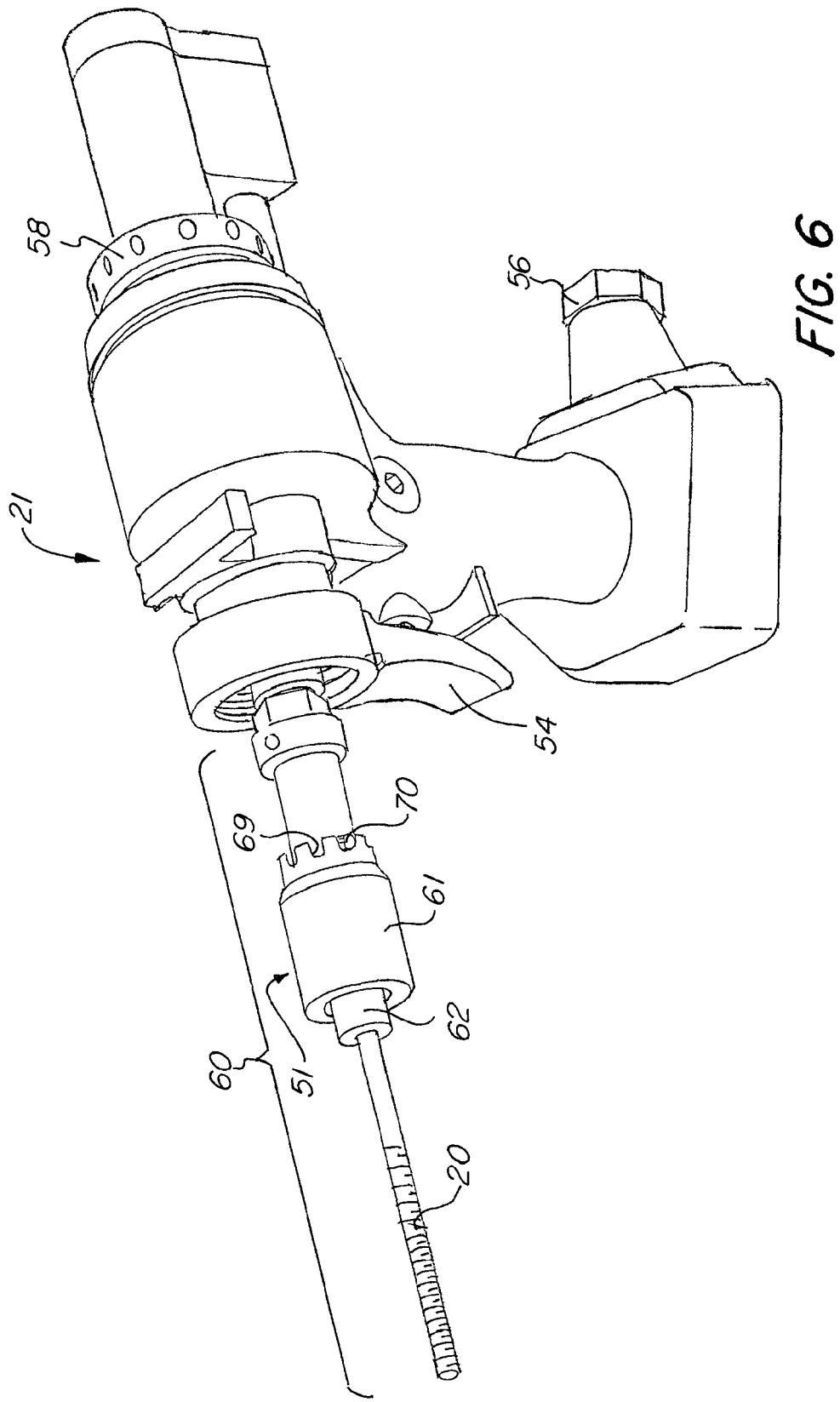

SYSTEM AND METHOD FOR INSTALLING A MANIFOLD PLUG

FIELD OF THE INVENTION

The following disclosure relates to a plug and a system, kit and method for installing the same. More particularly, the plug may be designed to seal manifolds or other devices that may have holes therein, for example, a hydraulic manifold.

BACKGROUND OF THE INVENTION

There are various plug and sealing systems generally known. For example, some commercially available plugs include a rivet system having a stem that is designed to break off during installation of the plug in a hole. The stem acts similar to a pop rivet. The manufacturing of the stem can be a complicated and expensive process as the stem must break off at the appropriate force in order to properly install the plug.

U.S. Pat. No. 4,584,755 to Lundquist discloses a tool and a plug for sealing a hole, for example, an unused coolant passage in an injection molding die. The plug includes a flexible, hollow cylindrical sleeve and a core member longitudinally interengageable into the sleeve. The core is of a generally cylindrical configuration. The sleeve is made of an elastomer material. The tool for installing the plug is activated by hand and does not appear to include any mechanical power. Further, the tool does not appear to have any depth control for controlling the installation depth of the insert.

U.S. Pat. No. 4,421,137 to Nusbaumer et al. discloses a plug assembly comprising a generally cylindrical expansion sleeve having a socket portion that receives a wedging nut. The head of a screw element engages with the sleeve on the side of the sleeve opposite the nut such that rotation of the screw pulls the nut into the sleeve. The threaded hole of the wedging nut extends all the way through the socket and the screw element remains in the hole after installation.

U.S. Pat. No. 8,381,934 to Brewer et al. discloses a sealing plug for blind installation. The plug includes a sleeve, a nut stem with a shoulder, and a head at least part of which is radially enlarged with respect to the stem. The nut stem is internally threaded such that when the nut stem is pulled axially, the shoulder presses against the sleeve and thereby expands the sleeve against a hole. There does not appear to be disclosure of the nut stem including a conical or tapered surface that presses against the sleeve. Further, the installation gun does not appear to include releasably secured and interchangeable end pieces.

Accordingly, it is desirable to provide an insert and sealing system that allows for easier installation and manufacturing. It is further desirable to provide an insert and sealing system that provides for repeatable installation of the plug in holes.

SUMMARY OF THE INVENTION

Therefore, it is an object of the present invention to provide an insert that can be installed without a stem.

It is yet another object of the present invention to provide an installation device that aids in the installation of the insert.

It is still another object of the present invention to provide a method for installing an insert using the installation device.

It is still another object of the present invention to provide a kit for installing a plurality of inserts in one or more holes.

It is still another object of the present invention to provide an insert that can withstand high pressures typically found in hydraulic manifolds.

These and other objects are achieved by providing an insert with a tapered core and a cylinder. The core releasably secures to an installation device. The installation device includes a depth stop or a depth control to control the installation depth of the insert. The insert may be installed in a tray that allows for easier handling of the inserts and installation thereof. In some cases, the core includes a threaded hole to releasably secure the insert to the installation device.

In one aspect, a system for sealing a hole is provided and includes an installation device having a drive. An end piece may be coupled to the installation device and the end piece may include a bore and a distal surface wherein a dimension of the distal surface is larger than a dimension of the hole. A pull-rod may be coupled to the drive. The pull-rod may further pass through the bore and have a threaded end. An insert including a cylindrical sleeve and a core has a threaded hole. The pull-rod is threaded into the threaded hole and the pull-rod is retracted by the drive to pull the core into the cylindrical sleeve thereby radially expanding the cylindrical sleeve against the hole.

In another aspect, an insert includes a core having a height and a tapered outer wall. A threaded hole is located in a first end of the core, a depth of the threaded hole is less than the height. A cylindrical metallic sleeve has an inner diameter. The cylindrical metallic sleeve is in contact with and surrounds at least part of the core. A second end of the core has an outer diameter larger than the inner diameter.

In still another aspect a device is provided for installing an insert in a hole. The device includes an end piece having a first bore. A pull-rod has a distal threaded end passing through the first bore. A first coupler has a second bore and a first stop. The first stop interacts with a proximal end of the pull rod to prevent the pull-rod from passing all the way through the second bore. An axial drive is secured to the first coupler. The axial drive moves the pull-rod in an axial direction.

In still another aspect a method is provided for sealing a hole. The method may include the steps of: Providing an insert with a metallic core defining a first axis and having a tapered wall and a central void, the insert further including a cylindrical metallic sleeve having a central bore defining a second axis where the metallic core is press-fit into the cylindrical metallic sleeve and the first and second axes align; Coupling a pull-rod of an installation device to the central void; Inserting the insert into an installation hole so that a distal surface of the installation device contacts a surface adjacent to the installation hole; Retracting the pull-rod so that the metallic core is pulled into the cylindrical metallic sleeve to radially expand the cylindrical metallic sleeve against a surface of the installation hole.

BRIEF DESCRIPTION OF THE DRAWINGS

FIG. 3 is a sectional view of the insert of FIG. 1A being threaded onto an installation machine.

FIG. 4A is a perspective view of a tray holding multiple inserts of FIG. 1A.

FIG. 4B is a side partial cutaway view of the tray of FIG. 4A.

FIG. 6 is a perspective view of a partially dis-assembled installation machine used to install the insert of FIG. 1A.

DETAILED DESCRIPTION OF THE INVENTION

Figure 1A:
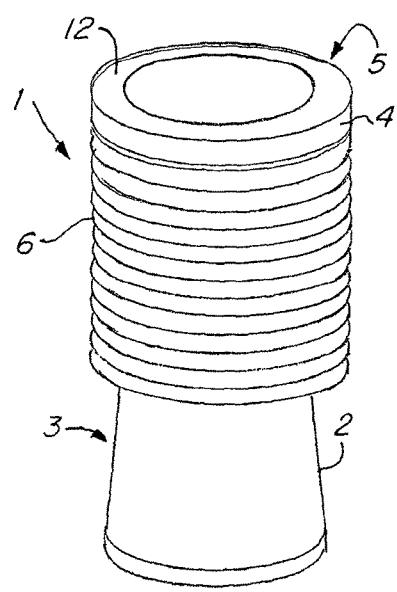
FIG. 1A is a perspective view of an exemplary insert.

In FIG. 1A-D, the insert 1 has two sections. As shown, core 3 has a tapered wall 2 and an upper cylindrical section 7. In some embodiments, the tapered section will extend from the top of the core towards the bottom. In some cases, a rounded section is disposed at the top of the core and the taper extends at the end of the rounded section. Cylindrical sleeve 5 has an outer surface which may include ridges or rings 6. The ridges may interact with an installation hole in order to better secure or seal the plug to the hole. Although ridges are shown, it is understood that other textures can be used on the outside of the plug. In the illustrated embodiment, the series of rings provide both additional resistance and friction against the inside of the installation hole. The rings can further act as flow stops that can help to prevent leakage through the installation hole when the insert is installed in the installation hole as fluid would need to pass beyond each of the ridges. Therefore, inconsistencies and surface irregularities in the hole can be taken into account by the ridges. The rings may further provide added resistance to blow out.

Figure 1C:
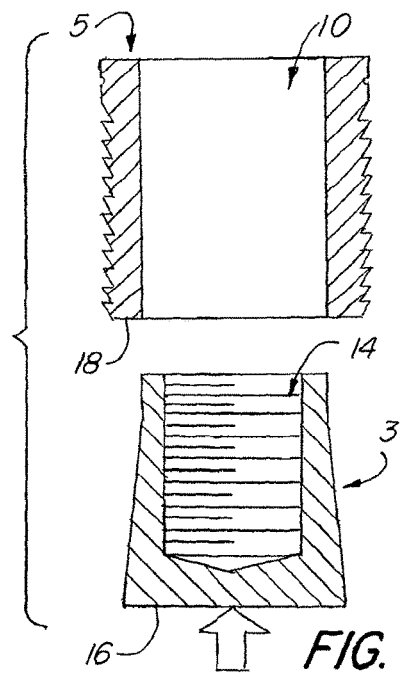
FIG. 1C is an exploded sectional view along section line 1c-1c of the insert of FIG. 1A.
Figure 1B:
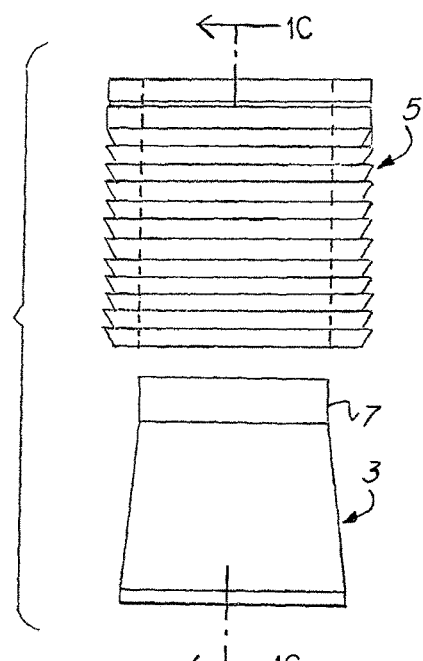
FIG. 1B is an exploded view of the insert of FIG. 1A.
Figure 1D:
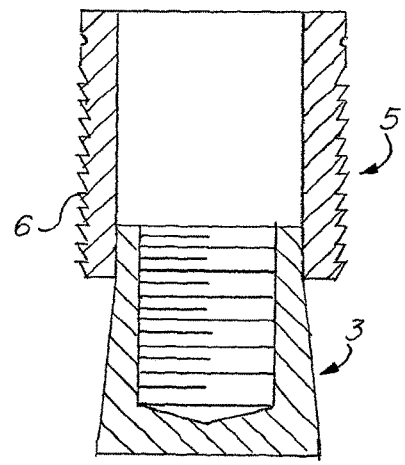
FIG. 1D is a side sectional view along section line 1c-1c of the insert of FIG. 1A.

Cylindrical sleeve 5 has a top surface 12 and has a void 10 passing through the cylindrical sleeve 5. Core 3 inserts into the void 10 at one end. In the illustrated embodiment of FIGS. 1A-1D, cylindrical section 7 of the core 3 is press fit into the lower end of sleeve 5. The tolerances between the diameter of the void 10 and the diameter of the cylindrical section 7 allow the cylindrical sleeve 5 to retain the core 3 to create an assembled insert as shown in FIG. 1D and FIG. 1A. The core 3 has a hole 14 that can releasably secure to an installation device. As shown in FIG. 1C and FIG. 1D, the hole 14 is threaded in order to provide the releasable securing. It is also contemplated that the hole 14 can include various structures that provide for releasable securing of the plug. For example, the hole may have a groove cut out there from that can interact with a catch that can extend or retract from the installation device. As one example, the hole 14 may include a first section with a first diameter and a second section with a second diameter disposed below the first section of the hole 14. A catch can interact with the second section or the downward facing surface defined between the first and second sections.

As further shown, the bottom 16 of core 3 is solid and the hole 14 does not pass all the way through the core 3. It is contemplated that certain applications for the plug may include the hole 14 extending all the way through core 3. As one example, hydraulic lines may be installed in an insert having a hole extending all the way through the core. In some cases, the threads used to install hydraulic or other lines may become damaged. Rather than replacing the entire manifold, the threaded hole of the manifold can be bored out and an insert can be inserted inside the bored out hole. When the threads pass all the way through the core 3, the insert can be used to repair threads for hydraulic lines.

Proximate to bottom section 18, a lip may be located within cylindrical sleeve 5. Further core 3 may include a corresponding lip close to the top of the tapered section or cylindrical section 7. These two lips can interact to prevent or resist the possibility that core 3 can be extracted from cylindrical sleeve 5.

Figures 2A, 2B:
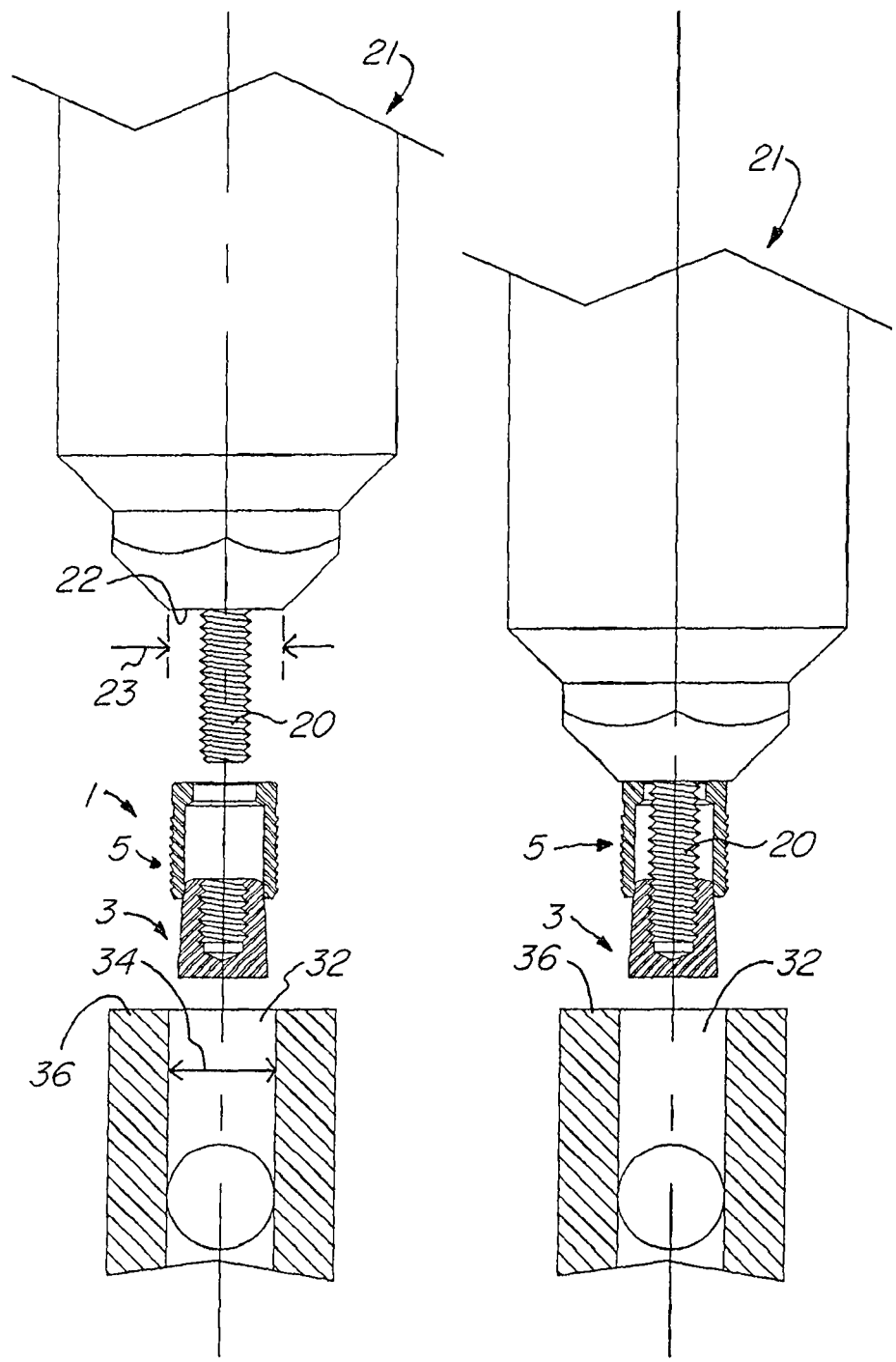
FIGS. 2A-2D are exemplary views of an insert similar to FIG. 1A being installed in a hole.
Figures 2C, 2D:
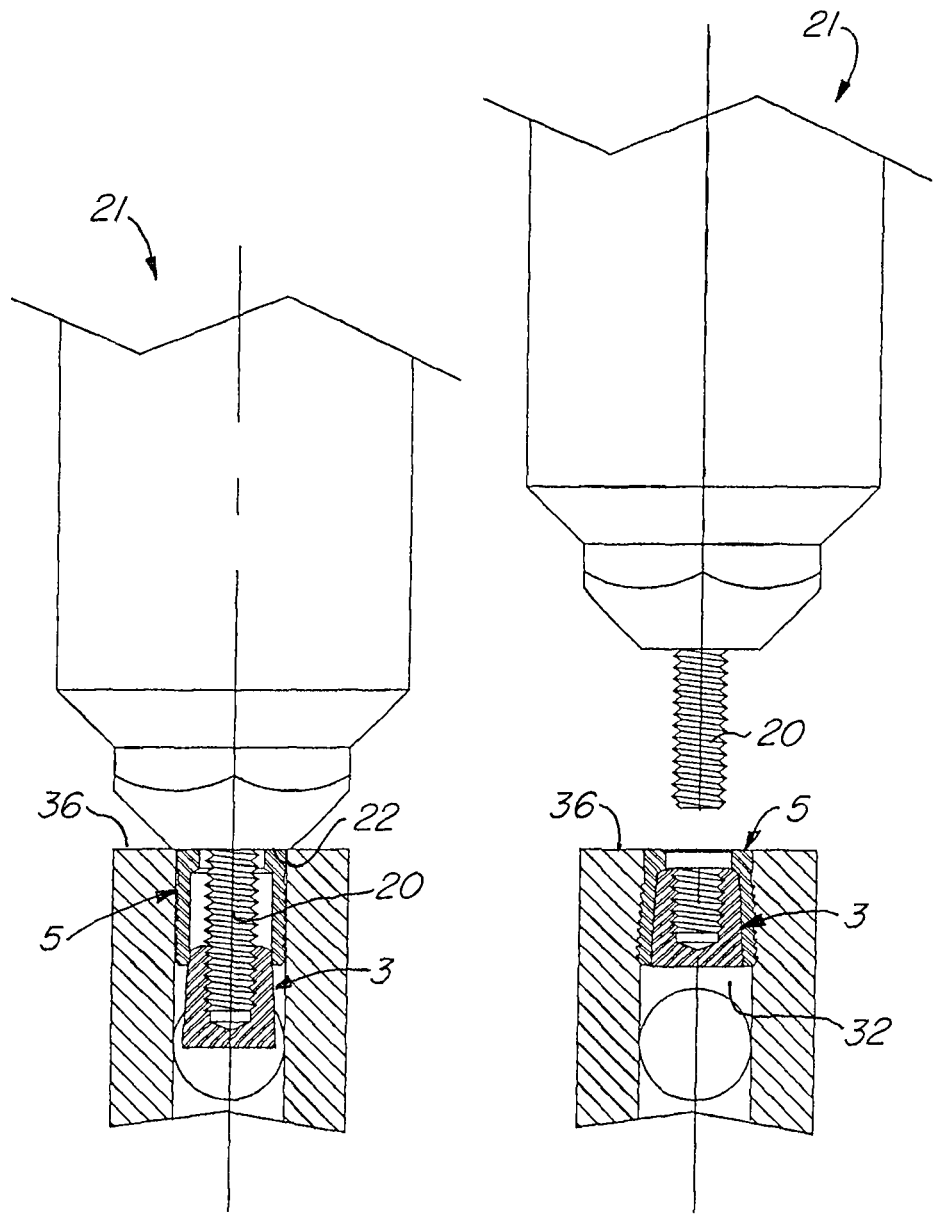

In FIGS. 2A-2D the insert 1 is shown being installed in installation hole 32. The pull-rod 20 is inserted into the insert to contact the threaded hole. In one embodiment, pressure on the pull-rod activates a switch to cause rotation of the pull-rod, thereby threading the pull-rod into the insert 1. In FIG. 2B, the insert is shown threaded onto the pull-rod 20. The top surface of the insert sleeve 5 is in contact with distal surface 22 of the installation device. The diameter of the hole 34 is smaller than the diameter or size 23 of the distal surface. As shown in FIG. 2C, when the insert is inserted into the hole 32, part of the distal surface 22 rests on the surface 36 that is adjacent to hole 32, thereby controlling the installation depth of the insert. From FIGS. 2c to 2d, pull-rod 20 is retracted into the installation device thereby radially expanding the insert against the wall of the hole. The pull-rod then extends and rotates out of the insert, leaving the insert installed in the hole 32.

In one embodiment, the core and sleeve of the insert are made of a metallic material, in some cases a steel or aluminum alloy can be used. In some embodiments, the insert can be design to resist blow out for pressures of 40,000 psi. The insert shown in FIGS. 2A-2D is shown in more detail in FIG. 9. As can be seen, top lip 11 provides an additional sealing function where the top surface of the core presses against lip 11 to provide additional leakage resistance.

The core and cylinder are sized so that the core can be press-fit into the cylinder. The taper angle of the core is designed to provide sufficient radial expansion without being so large as to progressively force the core out of the cylinder. Too large of an angle could result on too high of a resultant downward force between the cylinder and core which could force the core out of the cylinder over time. Therefore, the taper angle may be as large as 10°. Preferably, the angle is in the range of 5°-6°. The outer dimension of the sleeve and the inner dimension of the hole are typically also within close tolerances so that the radial expansion of the sleeve is sufficient to seal the hole. For example, the outer diameter of the sleeve may be 0" to 0.004" smaller than the diameter of the hole (diameter difference). It is understood that larger differences in diameter between the sleeve and the hole could still seal the hole, but may result in a lower blow out pressure. In addition, the ridges or ribs that protrude from the sleeve can provide additional guards for sealing the hole. It is understood that the ribs may be created by removal of material from the sleeve in channels to create the ribs or ridges that are raised with respect to the channel. These ribs or ridges can account for 0-20% of the outer diameter of the sleeve and more preferably 15-20% of the outer diameter of the sleeve. In some cases, the ridges can protrude 0.004-0.008" and preferably 0.006". Therefore, the ratio of ridge protrusion to diameter difference may be approximately 1:1-1:2 and preferably 1:1.5. The cylinder and core are typically made of relatively hard materials, for example steels. In some cases, the hardness may be measured as Re20 on the Rockwell hardness scale. In some cases the hardness of the rings or ridges may be increased so that the ridges are forced into the surface of the installation hole, thus providing added sealing and resistance to leakage. It is understood that the specific dimensional characteristics described herein are exemplary only and not limiting in scope.

In FIG. 3, the installation device is shown with the pull-rod 20 placed against the insert 1. The insert 1 is located in a tray 40. Upon exerting pressure against the insert, pull-rod 20 retracts slightly to activate switch 44. Upon activation of the switch, pull-rod 20 rotates to thread the insert onto the pull-rod. Once the insert is threaded onto the rod, the insert can be installed in the hole as shown in FIGS. 2A-2D.

It is understood that the installation device can also be a robotic or other mechanical arm that is computer or electronically controlled. For example, on an assembly line. In FIGS. 4A and 4B, a tray 40 has holes 42 disposed in a known pattern so that the installation device can pick up an insert by threading the pull-rod into the core. Therefore, the tray can come with a plurality of inserts pre-installed therein. In addition, one or more reference marks can be found on the insert tray in order to calibrate the location of the inserts. The inserts are pressed into the holes 42 so that part of the wall 41 contacts the insert. As shown in FIG. 4B, the wall contacts the bottom section of the core. It is understood that the tray can be designed to contact the sleeve or both the sleeve and core. In one embodiment, the torque exerted on the insert when the pull-rod 20 is threaded into the insert is less than the force exerted on the insert by contact with the tray 40. This force allows the pull-rod 20 to rotate without causing the insert to rotate within the hole 42. Thus allowing the insert to be connected to the pull-rod 20 without a human holding the insert. The tray further allows robotic installation systems to easily pick up inserts on assembly lines.

Figure 5:
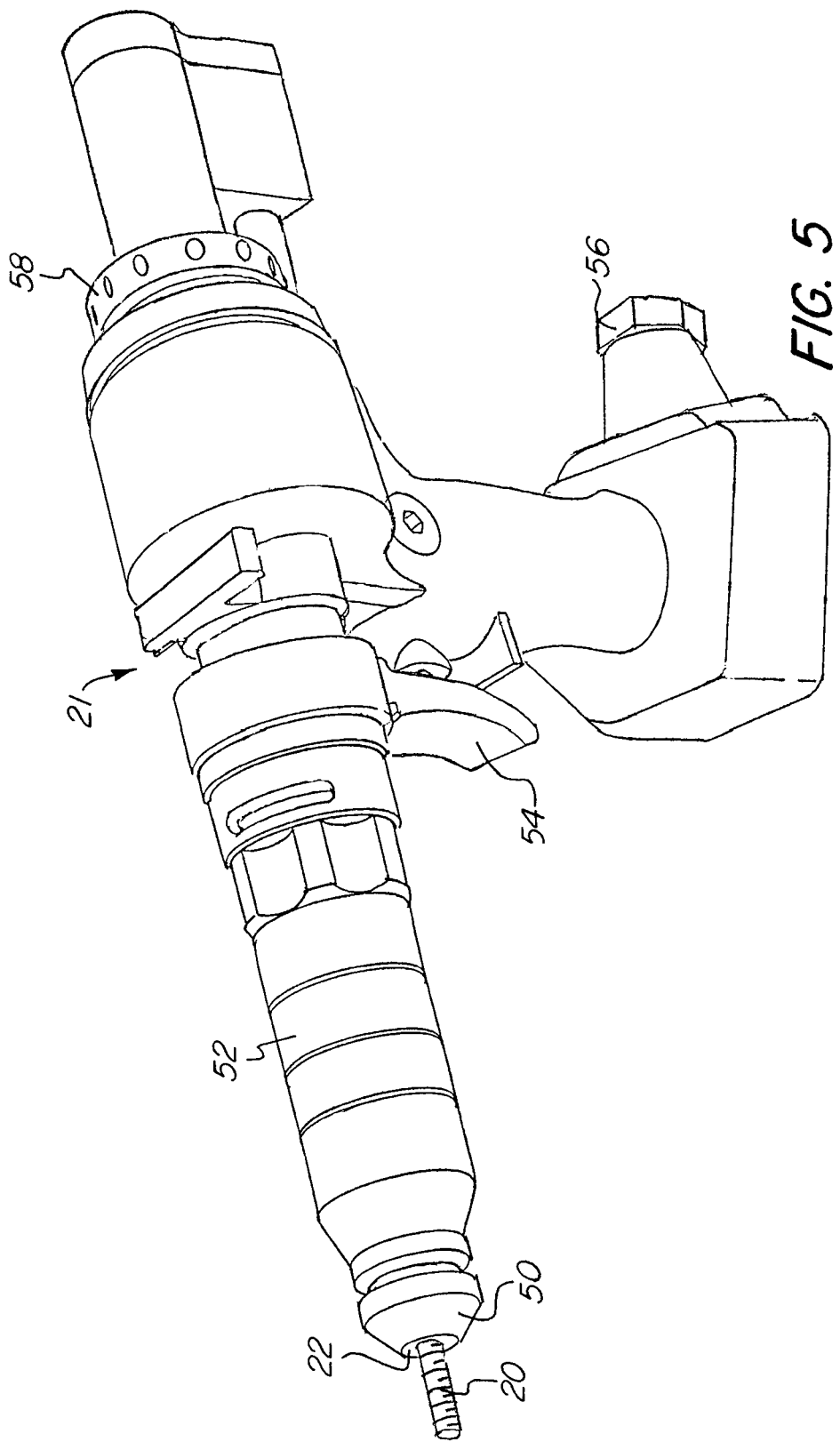
FIG. 5 is a perspective view of the installation machine used to install the insert of FIG. 1A.

In FIG. 5, an example of a hand-held installation device is shown. End piece 50 can be rotated to adjust the amount of the pull-rod extending from the end of the installation device 21. Casing 52 is shown, and the pull-rod retracts and rotates within this casing. Trigger 54 can be depressed to activate a retraction mechanism to pull the pull-rod into the casing in order to pull the core into the sleeve. Adjustment wheel 58 can be rotated to adjust the length of the pull stroke. The installation device 21 as shown is pneumatically activated. Connection 56 receives pneumatic supply lines that feed pressurized air to the installation device 21.

In FIG. 6, the casing 52 is removed and the internal couplings 60 of the installation device are shown. Pull-rod 20 as shown is a bolt with a threaded portion. The pull-rod is held by a first coupler 62 which is secured to the gun by a second coupler 61. Interlocking rod 70 and recess 69 prevent the second coupler 61 from rotating. The interlocking rod 70 can be spring loaded and retractable along the axis of the pull-rod so that the interlocking rod 70 can be retracted to allow the second coupler 61 to be rotated.

Figures 7A, 7B, 7C:
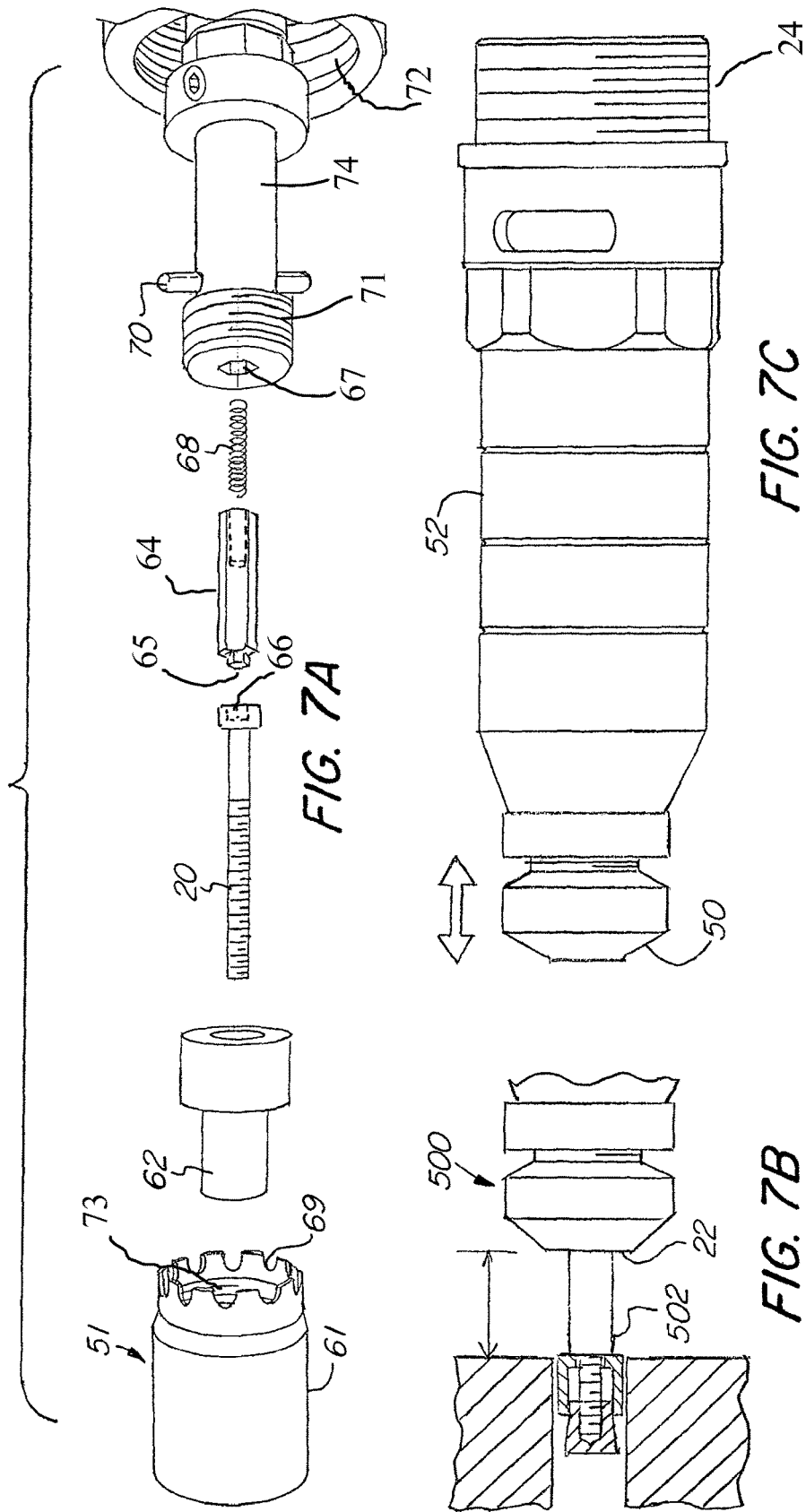
FIG. 7A is a side exploded view of the installation machine used to install the insert of FIG. 1A.
FIG. 7B is an alternate embodiment of the end piece of the machine used to install the insert of FIG. 1A.
FIG. 7C is a side view of the casing that covers the assembly of FIG. 7A.

In FIG. 7A, pull rod 20 includes a head with a hex recess 66. Hex protrusion 65 extends from a rotation coupler 64. The rotation coupler is inserted into hex hole 67 and spring 68 allows for the rotation coupler 64 to move back and forth. When pressed into the hole 67, coupler 64 activates switch 44 shown in FIG. 3 to cause rotation of the pull-rod. First coupler 62 has the pull-rod inserted therein, and the head of the bolt interacts with an internal surface of the first coupler 62 to provide an insertion stop. The insertion stop likewise exerts pressure on the underside of the head when coupling assembly 60 is retracted to radially expand the metallic sleeve of the insert. Second coupler 61 also includes a stop 75, recesses 69 and threads 73. The stop of the second coupler exerts pressure on the underside of the first coupler 62 when the coupling assembly is retracted. The female threads 73 interlock with male threads 71 of the retracting member 74. As previously discussed, rod 70 and recess 69 interact to secure the second coupler to the retracting member 74 to complete the coupling assembly 60. Sleeve 52 is hollow and extends over the coupling assembly 60 with threads 24 securing to threads 72. FIG. 7C shows the casing 52, which is installed over the assembly of FIG. 7A.

In FIG. 7B, an alternate end piece 500 is shown with a distal extension 502 extending from the end piece 500. This distal extension has a diameter smaller than the size of the installation hole, but large enough so that the distal surface of the distal extension 502 contacts top surface 12 of the insert. The length of the distal extension 502 controls the installation depth of the insert as distal surface 22 of the alternate end piece 500 contacts the outer surface 36 of the installation hole.

Figure 8:
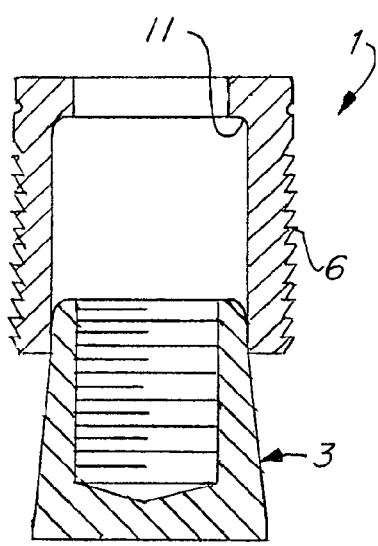
FIG. 8 shows an alternate embodiment of the insert of FIG. 1A.
Figure 9:
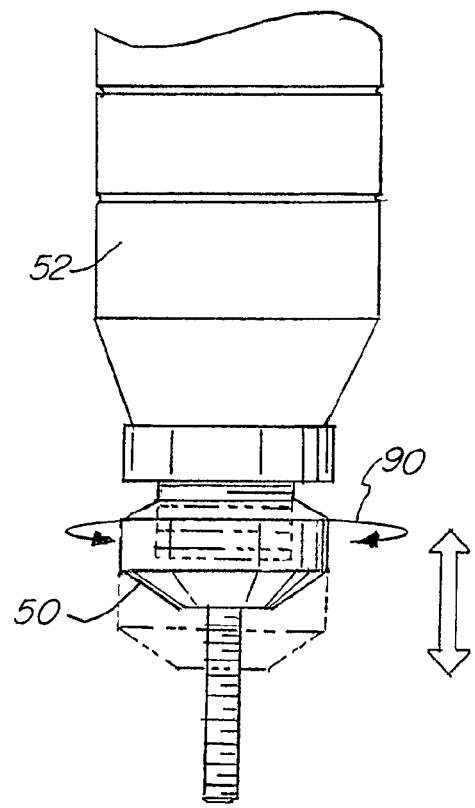
FIG. 9 shows how the position of the end piece of the machine used to install the insert of FIG. 1A can be adjusted.

In FIG. 8, the alternate embodiment of an insert is shown with a curved section 11 that mates with a corresponding curved section of the core when the core is pulled into the cylinder during installation. In FIG. 9, adjustment of the end piece 50 is shown. Rotation of the end piece 90 causes the end piece to extend or retract, thus adjusting how much of the pull-rod 20 extends past the distal surface 22.

Sealing is obtained by the expansion of the insert against the hole which may be in a manifold. Further, the depth the tapered section is pulled into the cylindrical section may be predetermined and repeatable regardless of hole size based on a pull setting of the installation device. The depth of pull can also be controlled by a force sensor or a control system. For example, upon reaching a certain pull force, the installation device may stop pulling on the insert and proceed to release the insert from the end piece. The pre-determined pull force may be set based on hole size, insert size or other criteria related to the installation of the plug in the hole. The insert when installed withstands high pressures commonly found in hydraulic manifolds and systems. For example, some embodiments of the inserts shown and described herein can withstand pressures up to and in excess of 40,000 PSI.

Although generally round inserts have been shown, it is understood that the geometry of the plug can change in order to interact with the hole to be sealed. It is further understood that various types of drives may be employed with the installation device, for example hydraulic or electric motor drives can be employed.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for sealing a hole having a first diameter comprising:
   an installation device having a drive;
   an end piece coupled to said installation device and including a bore and a distal surface wherein a dimension of said distal surface is larger than a dimension of the hole;
   a pull-rod coupled to said drive and passing through said bore, the pull-rod having a threaded end;
   an insert including a cylindrical sleeve and a core, the cylindrical sleeve being metallic and having a through hole with the core positioned in the through hole, the core having a threaded hole at a first end and a tapered outer wall, wherein a maximum outer diameter of said insert is equal to or less than the first diameter and a depth of the threaded hole is less than a height of the core a second end of said core having an outer diameter larger than the inner diameter;

a switch coupled to a rotation drive and said pull-rod coupler such that axial pressure on said pull-rod activates said switch;

wherein activation of said switch causes said rotation drive to rotate said pull-rod; and said pull-rod threadable into the threaded hole and said pull-rod retractable by said drive to pull the core into the cylindrical sleeve thereby radially expanding the cylindrical sleeve against the hole wherein the installation device and insert are configured such that after retraction of said pull-rod to pull the core into the cylindrical sleeve, said installation device is configured to rotate said pull-rod and release the threaded end from the threaded hole of the core.

2. The system of claim 1 wherein the core has a height greater than a depth of the threaded hole.

3. The system of claim 1 wherein said distal surface contacts a surface adjacent to the hole to control an installation depth of said insert in the hole.

4. The system of claim 1 wherein at least part of said core is press-fit into the cylindrical sleeve.

5. The system of claim 1 further comprising protrusions located on an outer surface of said metallic sleeve, said protrusions configured as at least two separate rings.

6. The system of claim 1 further comprising:

an outer support connected to said installation device and having a distal end;

said end piece threaded into said outer support at said distal end;

wherein a distance between the distal surface and said distal end is adjustable through rotation of said end piece.

7. The system of claim 1 further comprising:

a tray having a plurality of voids, at least one of which has an insert placed therein;

wherein the voids have a size so that when the insert is pressed into one of the voids, rotation of said pull-rod inside the threaded hole creates a torque less than a friction force exerted against the cylindrical sleeve;

said threading step including threading said pull-rod into the insert that is placed in said tray.

8. The system of claim 1 further comprising:

a button wherein pressure on said button causes the axial drive to retract along an axis of the pull-rod.

9. The system of claim 1 further comprising:

a first coupler;

a second coupler having a stop;

said first coupler inserted into said second coupler;

wherein said drive is secured to said first coupler with said second coupler.

10. The system of claim 1 further comprising:

said pull-rod coupler in contact with the proximal end of said pull rod so that rotation of said pull-rod coupler causes rotation of said pull-rod.

11. The system of claim 1 wherein said rotation drive and said axial drive are each selected from the group consisting of: a pneumatic drive, a hydraulic drive, an electric motor drive and combinations thereof.

12. The system of claim 1 further comprising:

a distal surface located on said end piece and having a dimension larger than a dimension of the hole.

13. The system of claim 12 wherein retraction of said pull-rod causes said distal surface to bear against said cylindrical sleeve so that said core is pulled into and causes radial expansion of said cylindrical sleeve.

* * * * *